US009213839B2

United States Patent
Cao et al.

(10) Patent No.: US 9,213,839 B2
(45) Date of Patent: Dec. 15, 2015

(54) MALICIOUS CODE DETECTION TECHNOLOGIES

(71) Applicant: HUAWEI TECHNOLOGIES CO.,LTD., Shenzhen, Guangdong (CN)

(72) Inventors: Yinzhi Cao, Northfield, IL (US); Xiang Pan, Northfield, IL (US); Yan Chen, Northfield, IL (US); Jianwei Zhuge, Northfield, IL (US); Xiaobin Qian, Beijing (CN); Jian Fu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 47 days.

(21) Appl. No.: 14/207,665

(22) Filed: Mar. 13, 2014

(65) Prior Publication Data

US 2014/0283041 A1    Sep. 18, 2014

Related U.S. Application Data

(60) Provisional application No. 61/786,200, filed on Mar. 14, 2013.

(51) Int. Cl.
G06F 21/56    (2013.01)
(52) U.S. Cl.
CPC ........ G06F 21/563 (2013.01); *G06F 2221/033* (2013.01)
(58) Field of Classification Search
CPC ..... G06F 21/554; G06F 21/566; G06F 21/72; G06F 2221/033; G06F 21/563; H04L 63/1408
See application file for complete search history.

(56) References Cited

U.S. PATENT DOCUMENTS

| 7,724,684 | B2* | 5/2010 | Cassod et al. | 370/252 |
| 8,612,995 | B1* | 12/2013 | Yun | 719/313 |
| 8,826,439 | B1* | 9/2014 | Hu et al. | 726/24 |
| 2009/0327688 | A1 | 12/2009 | Li et al. | |
| 2011/0167496 | A1* | 7/2011 | McPhail et al. | 726/24 |
| 2012/0240231 | A1* | 9/2012 | Sohn et al. | 726/24 |
| 2014/0137255 | A1 | 5/2014 | Wang et al. | |

FOREIGN PATENT DOCUMENTS

| CN | 101304409 A | 11/2008 |
| CN | 101359351 A | 2/2009 |
| CN | 101388057 A | 3/2009 |
| CN | 102254120 A | 11/2011 |
| EP | 1542115 A1 | 6/2005 |

* cited by examiner

*Primary Examiner* — Chau Le
*Assistant Examiner* — Ghodrat Jamshidi
(74) *Attorney, Agent, or Firm* — Huawei Technologies Co., Ltd.

(57) ABSTRACT

An embodiment of the present application provides technologies for detecting malicious content embedded in a content downloaded from an external source. The downloaded content converted into an opcode sequence by a web browser in a computing device. The opcode sequence is compared with a pre-stored opcode signature. The opcode signature comprises multiple sentences, and each sentence has multiple clauses. Each clause may include a matching opcode, a condition, an instruction, and an identifier. When a matching opcode in a clause matches with an opcode of the opcode sequence, and the condition as specified in the clause is determined to be true, the instruction in the clause is taken and next sentence identified by the identifier is taken to match the opcode sequence. Eventually, the last taken clause in the opcode signature may instruct whether opcode sequence contains malicious code.

17 Claims, 7 Drawing Sheets

```
1:  State ← Starting_State
2:  for Input_Opcode in All_Opcodes do
3:      for Signature in Pool[Input_Opcode] do
4:          Sentence ⇐ Signature[State]
5:          Clause ⇐ Sentence.Clause
6:          if equal(Method, Match) then
7:              if (IsAllTrue(Clause.Conditions) then
8:                  Take Actions
9:                  Signature.State ⇐ New_State
10:                 Break
11:             end if
12:         else(equal(Method, Default))
13:             Default Actions
14:             Signature.State ⇐ Default_State
15:             Break
16:         end if
17:     end for
18: end for
```

Fig. 8

MALICIOUS CODE DETECTION TECHNOLOGIES

CROSS REFERENCE TO RELATED APPLICATIONS

This application claims priority to U.S. provisional application No. 61/786,200, filed on Mar. 14, 2013 and entitled "De-obfuscation and Signature Matching Technologies for Detecting Malicious Code", which is incorporated herein by reference in its entirety.

TECHNICAL FIELD

The application generally relates to computer security technologies, and more specifically, to malicious code detection technologies.

BACKGROUND

The term "malicious code" in this application refers to any type of computer software that causes harm to a computer system. A malicious code may be contained in an electronic file (referred to as a content hereinafter) such as an application software, an audio file, a video file, or a Portable Document Format (PDF) document, and the computer system may obtain such a content from an affected website, unknowingly, though a so-called drive-by downloading.

Drive-by downloading is an unintended downloading of a malicious code from an external source such as the Internet. In past a few years, drive-by downloading attacks, which exploit browser vulnerabilities, have become a major venue for attackers to control a benign computer. A download of a malicious code usually happens without computer owner's knowledge. The "supplier" of the malicious code may claim that the owner "consented" to the download, but the owner is actually unaware of the download. Afterwards, by executing the malicious code, an application is invoked. The application performs its nefarious purposes. Normally, a mere visit to a malicious web site can lead to a download and subsequent execution of the malicious code on a visiting computer. Unfortunately, most malicious codes are obfuscated and difficult to be detected.

SUMMARY

It is an object of the present application to provide technologies for detecting malicious codes in a downloaded electronic content.

According to a first aspect of the application, a method, executed by a computing device, for identifying malicious codes in electronic contents is provided. The computing device obtains an opcode (operation code) sequence from a downloaded content. The opcode sequence includes a first opcode and a second opcode. The computing device compares the opcode sequence with a pre-stored opcode signature to determine whether the opcode sequence contains any malicious code. The opcode signature includes a first sentence and a second sentence. The first sentence includes a first matching clause. The first matching clause includes a first matching opcode, a first condition, a first instruction for a first action to be taken, and an identifier identifying the second sentence. The second sentence includes one or more second matching clauses and a default clause, each second matching clause includes a second matching opcode, a second condition, and a second instruction for is second action to be taken. The default clause includes a third instruction for a third action to be taken.

In the method, comparing the opcode sequence with a pre-stored opcode signature to determine whether the opcode sequence contains any malicious code includes: determining whether the first opcode of the opcode sequence matches with the first matching opcode, and the first condition is true. If the first opcode matches with the first matching opcode, and the first condition is true, the computing device takes the first action according to the first instruction. The computing device searches the second sentence for a matching clause among the one or more second matching clauses, wherein the second opcode of the opcode sequence matches with a matching opcode of the matching clause. If the matching clause in the second sentence is found, and the second condition in the matching clause is true, takes an action according to the second instruction in the matching clause. If the matching clause in the second sentence is not found, taking the third action according to the third instruction in the default clause of the second sentence.

The third action may include reporting that the opcode sequence contains malicious code.

In a possible implementation of the method according to the first aspect, the second opcode may be placed sequentially next to the first opcode in the opcode sequence.

In another possible implementation according to the first aspect or any of the preceding implementation(s), the method may further include: after receiving the opcode sequence and before obtaining the opcode signature to determine whether the opcode sequence contains malicious content, obtaining the opcode signature in a filtering format which includes an expression; and determining whether the opcode sequence contains any opcode that matches with the expression.

In yet another possible implementation according to the first aspect, or according to any of the preceding implementations, before obtaining the opcode sequence, the method may further include obtaining the downloaded content, and obtaining the opcode sequence from the downloaded content may comprise: executing codes of the downloaded content by a program installed in the computing device to obtain the opcode sequence.

According to a second aspect of the application, a computing device for identifying malicious code in electronic contents is provided. The computing device includes a memory and one or more processors. The memory is configured to store an opcode signature and one or more software modules for execution by the one or more processors. The one or more software modules include instructions for: obtaining an opcode sequence from a downloaded content, wherein the opcode sequence includes a first opcode and a second opcode; and comparing the opcode sequence with the opcode signature to determine whether the opcode sequence contains any malicious code. The opcode signature includes a first sentence and a second sentence. The first sentence includes a first matching clause, the first matching clause includes a first matching opcode, a first condition, a first instruction for a first action to be taken, and an identifier identifying the second sentence. The second sentence includes one or more second matching clauses and a default clause, each second matching clause includes a second matching opcode, a second condition, and a second instruction for a second action to be taken, the default clause includes a third instruction for a third action to be taken. Comparing the opcode sequence with the opcode signature to determine whether the opcode sequence contains any malicious code comprises: determining whether the first opcode of the opcode sequence matches with the first matching opcode, and the first condition is true; if the first opcode matches with the first matching opcode, and the first condition is true, taking the first action according to the first instruction; searching the second sentence for a matching clause among the one or more second matching clauses, wherein the second opcode of the opcode sequence matches with a matching opcode of the matching clause. If the matching clause in the second sentence is found, and the second condition in the matching clause is true, taking an action according to the second instruction in the matching clause. If, the matching clause in the second sentence is not found, taking the third action according to the third instruction in the default clause of the second sentence.

The third action may include reporting that the opcode sequence contains malicious code.

In a possible implementation of the computing device according to the second aspect, the second opcode may be placed sequentially next to the first opcode in the opcode sequence.

In another possible implementation of the computing device according to the second aspect, or according to any preceding implementation(s) of the computing device, the one or more software modules may further include instructions for: obtaining the opcode signature in a filtering format which includes an expression; and determining whether the opcode sequence contains any opcode that matches with the expression.

In yet another possible implementation of the computing device according to the second aspect, or according to any preceding implementations of the computing device, the one or more software modules may further include instructions for: obtaining the downloaded content; and obtaining the opcode sequence from the downloaded content may include: executing codes of the downloaded content by a program installed in the computing device to obtain the opcode sequence.

According to a third aspect of the application, a computer program product is provided. The computer program product includes computer readable storage medium which stores computer readable instructions. The instructions, when executed by a computing device, cause the computing device to perform a method that includes: obtaining an opcode sequence from a downloaded content, wherein the opcode sequence includes a first opcode and a second opcode; and comparing the opcode sequence with a pre-stored opcode signature to determine whether the opcode sequence contains any malicious code. The opcode signature includes a first sentence and a second sentence. The first sentence includes a first matching clause. The first matching clause includes a first matching opcode, a first condition, a first instruction for a first action to be taken, and an identifier identifying the second sentence. The second sentence includes one or more second matching clauses and a default clause. Each second matching clause includes a second matching opcode, a second condition, and a second instruction for a second action to be taken. The default clause includes a third instruction for a third action to be taken. Comparing the opcode sequence with the pre-stored opcode signature to determine whether the opcode sequence contains any malicious code comprises: determining whether the first opcode of the opcode sequence matches with the first matching opcode, and the first condition is true; if the first opcode matches with the first matching opcode, and the first condition is true, taking the first action according to the first instruction; searching the second sentence for a matching clause among the one or more second matching clauses, wherein the second opcode of the opcode sequence matches with a matching opcode of the matching clause; if the matching clause in the second sentence is found, and the second condition in the matching clause is true, taking an action according to the instruction in the matching clause, if the matching clause in the second sentence is not found, taking the third action according to the third instruction in the default clause of the second sentence.

The third action includes reporting that the opcode sequence contains malicious code.

In a possible implementation of the computer program product according to the third aspect, the second opcode may be placed sequentially next to the first opcode in the opcode sequence.

In another possible implementation of the computer program product according to the third aspect, or according to any preceding implementation(s) of the computer program product, the method may further include obtaining the opcode signature in a filtering format which includes an expression; and determining whether the opcode sequence contains any opcode matching with the expression.

In yet another possible implementation of the computer program product according to the third aspect, or according to any preceding implementations of the computer program product, the method may further include obtaining the downloaded content; and obtaining the opcode sequence from the downloaded content may include executing the codes of the downloaded content by a program installed in the computing device to obtain the opcode sequence.

Other systems, methods, features, and advantages of the present application will be or become apparent to one with skill in the art upon examination of the following drawings and detailed description. It is intended that all such additional systems, methods, features, and advantages be included within this description, be within the scope of the present application, and be protected by the accompanying claims.

BRIEF DESCRIPTION OF THE DRAWINGS

Preferred features of the present disclosure will now be described, by way of non-limiting embodiments, with reference to the accompanying drawings, in which:

FIG. 8 is an exemplary pseudo-code used in the malicious code detecting process.

Figure 1:
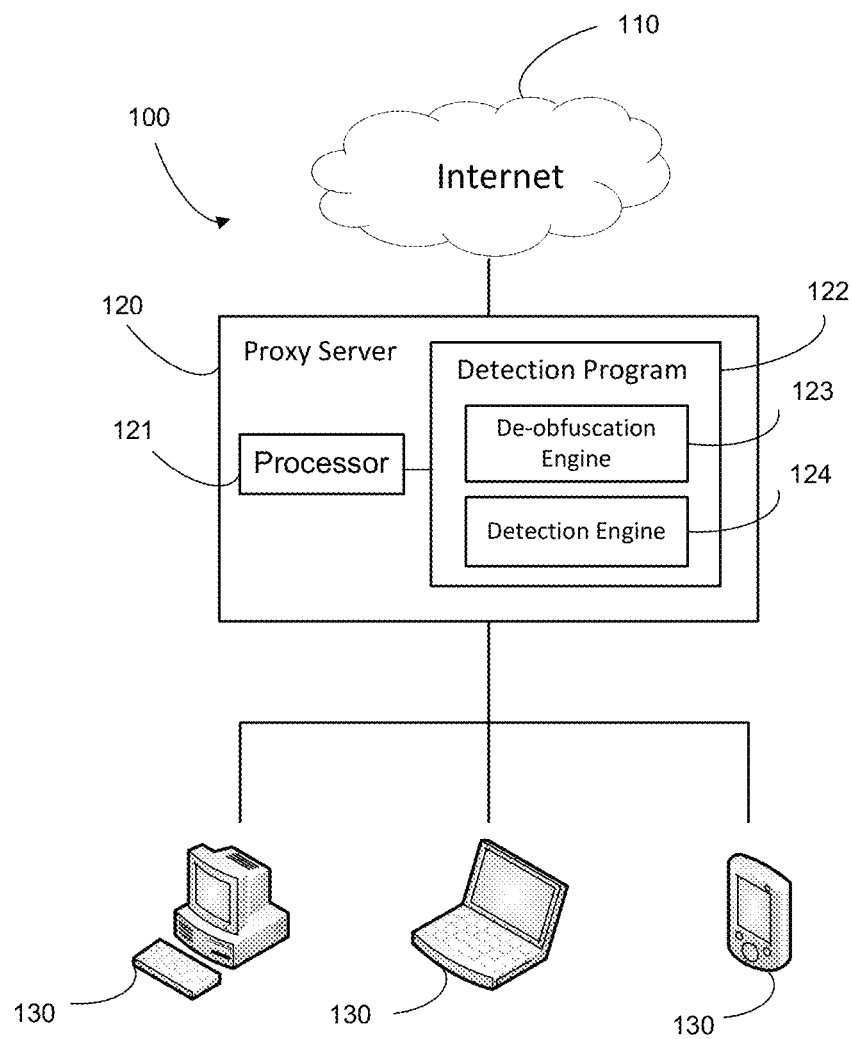
FIG. 1 is a simplified block diagram of a computer networking system.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

In order to make the aforementioned objectives, technical solutions and advantages of the present application more comprehensible, a detailed description is provided below. References will now be made to embodiments, examples of which are illustrated in the accompanying drawings. Insofar as block diagrams, flowcharts, and/or examples contain one or more functions and/or operations, it will be understood by those within the art that each function and/or operation within such block diagrams, flowcharts, or examples can be implemented, individually and/or collectively by a wide range of hardware, software, firmware, or virtually any combination thereof. Also, it will be apparent to one of ordinary skill in the art that the present application may be practiced without these specific details.

FIG. 1 is a block diagram of an exemplary computer networking system 100 in which a process for detecting malicious code in a downloaded content, e.g. malicious code embedded in a web page downloaded from a website, can be implemented. As shown in FIG. 1, the computer networking system 100 includes a proxy server 120, and one or more client devices 130 that are connected to the proxy server 120. The proxy server 120 facilitates the access to contents in an external source such as the Internet 110 by the client device(s) 130. Contents downloaded from the Internet 110 may reach the client devices 130 through the proxy server 120. Thus, the proxy server 120 is in a position of examining the downloaded contents and determining whether the contents contain malicious codes. The proxy server 120 may prevent a malicious code being downloaded by a client device 130 if the malicious code is detected. The networking system 100 may also include additional servers, client devices, and other devices that are not shown in FIG. 1.

The networking system 100 may be any interconnecting system, and it may utilize any suitable communication protocols and technologies capable of transmitting electronic contents such as audio files, video files, signals, data, messages, application programs or any combination thereof among network entities.

A client device 130 may be any computer system or device, such as a computer terminal, a workstation, a desktop computer, a laptop computer, a tablet device, a cellular phone, a set-top box, a networked television set, or other devices that are capable of acting as a client device in the networking system 100. The client device 130 may include any operating system for computers such as MAC-OS™, WINDOWS™, UNIX™, LINUX™, or any operating system for portable devices, such as SYMBIAN™, ANDROID™, etc.

As shown in FIG. 1, the proxy server 120 includes appropriate hardware components such as a processor 121 for executing a detection program 122 for detecting malicious codes in an electronic content. The detection program 122 may be stored in a storage medium of the proxy server 120 and it includes a de-obfuscation engine 123 for de-obfuscating an obfuscated malicious code, and a detection engine 124 for detecting the malicious code. The detecting program 122 serves to protect the client device(s) 130 from the harm caused by the malicious code. It should be appreciated that the de-obfuscation engine 123 and/or the detection engine 124 may also be installed in a client device, in a search server such as a Google™ server, a Bing™ server, or in any other devices connected to the Internet and capable of receiving and processing the content requested by the client device 130. Although the detection program 122 includes two engines, the de-obfuscation engine 123 and the detection engine 124 may be installed in a single device, or separately in difference devices throughout the networking system 100.

In order to detect malicious code, firstly, content downloaded from the Internet 110 is executed and converted into an opcode (short for operation code, the portion of a machine language instruction that specifies the operation to be performed) sequence by the de-obfuscation engine 123. Then the detection engine 124 matches the opcode sequence with a signature to determine whether the opcode sequence contains malicious code. Details about de-obfuscation and detection of the malicious code are provided below.

1. De-Obfuscation of the Malicious Code

The following description uses JavaScript as an exemplary programming language for illustration purposes. People skilled in the art would appreciate that any programming language available for a web browser, such as Java™, ECMAScript™, Jscript™, or VBScript™, may be used to perform the similar functions.

Most malicious JavaScript codes (scripts) are heavily obfuscated. In fact, it is not rare for these scripts to be hidden under several layers of obfuscation. Producers of the malicious codes may use a large variety of obfuscation techniques, such as Eval and setTimeout. De-obfuscation techniques commonly resort to execution of a script by a browser to de-obfuscate the downloaded malicious code therein. However, an incomplete execution of a downloaded JavaScript code, in some situations discussed below, may hamper the detection of the malicious code. On the other hand, in order to avoid being executed by a JavaScript engine of the browser, some malicious code may be deliberately embedded inside Document Object Model (DOM) events.

The following Example 1 shows a JavaScript code embedded inside a DOM event. This DOM event may not be triggered (i.e. being executed to obtain an opcode of the embedded code) if the browser does not recognize it and, therefore, the malicious JavaScript code embedded in the DOM event may successfully bypass the execution.

Example 1

```
1 <doy onload + "setTimeout(decode('malicious js'));">
2   <div onmouseover "eval(decode('malicious js'));">
3   </div>
4 </body>
```

In order to execute the code embedded inside a DOM event, the DOM event must be triggered. The following embodiment provides a de-obfuscation engine for triggering DOM events.

Figure 2:
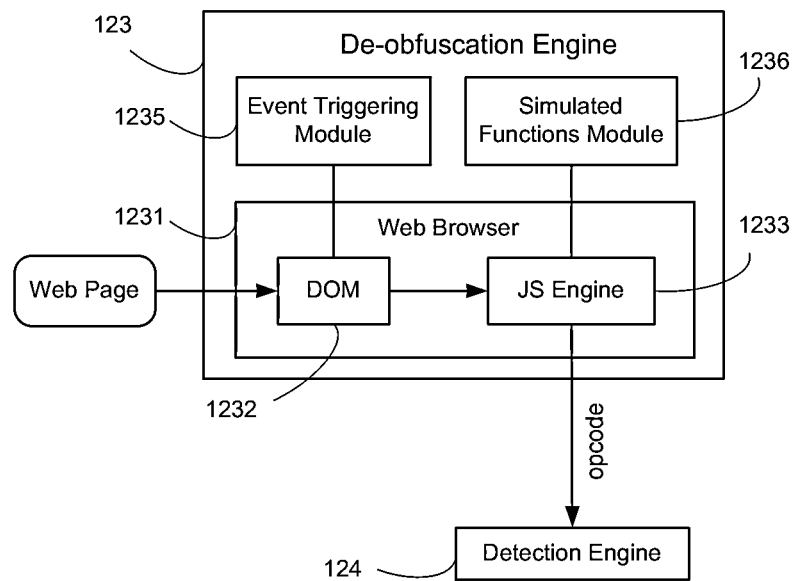
FIG. 2 is a simplified block diagram of a de-obfuscation engine according to an embodiment of the application.

FIG. 2 is a block diagram of the de-obfuscation engine 123 according to an embodiment of the present application. The de-obfuscation engine 123 includes a web browser 1231, an event triggering module 1235 and a simulated functions module 1236. Generally, the web browser 1231 of the de-obfuscation engine 123 takes one or more web pages as an input, de-obfuscates the JavaScript code of the web pages by executing the JavaScript code, and outputs a corresponding opcode sequence. The opcode sequence is then fed into the detection engine 124 for detecting the malicious code.

As mentioned above, some malicious code may be embedded in one or more DOM events to avoid execution. In order to trigger these DOM events, the event triggering module 1235 is provided. The event triggering module 1235 mimics a user's behavior, so as to trigger the DOM events. After a DOM event is triggered, code embedded in the DOM event is executed by the web browser 1231 of the de-obfuscation engine 124.

The web browser 1231, commonly referred to as a browser, normally is a software application for retrieving, presenting and traversing information resources on the World Wide Web. An information resource may be identified by a Uniform Resource Identifier (URI) and may be a web page, an image, a video file or any other kinds of content as mentioned above. The web browser 1231 may be any commonly known browser, such as Chrome™, Firefox™, Internet Explorer™, Opera™, Safari™, etc.

The web browser 1231 may include a DOM module 1232 and a JavaScript (JS) engine 1233. The JavaScript engine 1233 is specialized computer software which interprets and executes the JavaScript code. The JavaScript code of the web page is interpreted into an opcode sequence by the JavaScript engine 1233.

Figure 3:
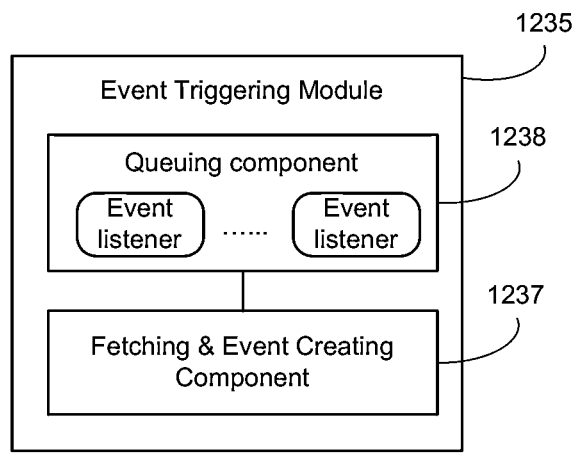
FIG. 3 is a simplified block diagram of an event triggering module of the de-obfuscation engine according to an embodiment of the application.

A functional structure of the event triggering module 1235 is shown in FIG. 3. The event triggering module 1235 includes a queuing component 1238 for storing one or more registered event listeners as a queue. A fetching and event creating component 1237 fetches an event listener stored in the queue, for example, the first event listener in the queue, and creates a corresponding event. The DOM events in the JavaScript code of the web page are captured by the event listeners and the captured events are "bubbled" (i.e. events are created and executed one by one) through the DOM module 1232. The event listener fetched by the fetching and Event creating component 1247 will be removed from the queue.

To speed up the event triggering process, the event triggering module 1235 adopts a two-stage procedure. At the first stage, when an onload event in the web page has not been triggered, the event triggering module 1235 captures registered event listeners and records them in the queue. At the second stage, after the onload event is executed; the module triggers the event listeners in that queue.

During the process of triggering the event listeners, there are several situations that need to be dealt with. For example, new event listeners may be registered after the onload event is executed. For these newly registered event listeners, the queuing component 1238 of the event triggering module 1235 may add them to the queue and consequently, the fetching and event creating component 1237 may fetch and create a corresponding event when other previously stored event listeners in the queue are triggered.

For another example, certain event listener (e.g., an onerror listener belonging to a front page of the website Sina™ China) may repeatedly register itself. In this case, the queuing component 1238 of the event triggering module 1235 may count how many times an event listener with a certain <Event Target, Event Type> pair is triggered. If the number exceeds a threshold, the event will not be triggered any more.

For another example, certain event listener may redirect the current frame to another web page. In this case, the event triggering module 1235 denies such an action by cancelling the redirection to the other web page.

During the execution of the JavaScript code, an unexpected error may occur and that stops the execution of the JavaScript code. For example, disparities between different JavaScript Engines may lead to an incomplete execution. Different JavaScript engines, such as Internet Explorer™ JavaScript engine, V8 of Google Chrome™, and SpiderMonkey of Firefox™, all have their own set of JavaScript functions. For example, a "gc" function in certain versions of Firefox™ may not be supported by other browsers. In some existing malicious code detection approaches, when executing a JavaScript code in one JavaScript engine, the execution may stop if there is a function in the JavaScript code that is not recognized by the JavaScript engine.

An unsupported function is a function that is not defined by a JavaScript engine of a specific web browser. For example, CollectGarbage, a function defined in Internet Explorer's JavaScript engine, is not supported by Firefox's JavaScript engine such as SpiderMonkey™ JavaScript engine. The following Example 2 shows such an example, where a CollectGarbage function is defined in Internet Explorer™ JavaScript engine but not in some other JavaScript engines. The execution of the JavaScript code shown in Example 2 may stop in some JavaScript engines.

Example 2

```
1   function exploit ( )  {
2           CollectGarbage ( );
3           eval (obfuscated exploiting codes);
4   }
```

A solution to this problem is provided herein. As shown in FIG. 2, the de-obfuscation engine 123 includes a simulated functions module 1236. The simulated functions module 1236 provides definitions of unsupported functions for enabling the JavaScript engine 1233 to continue executing the JavaScript code containing an unsupported function. If the execution generates an error caused by an unsupported function, the simulated functions module 1236 looks up functions in the database to acquire a corresponding function of the unsupported function, and then the execution continues.

Figure 4:
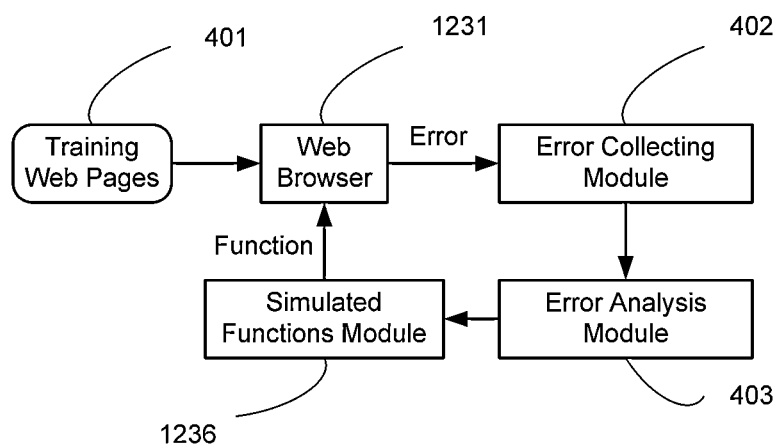
FIG. 4 is simplified process flow diagram of unsupported functions being analyzed and added to the simulated functions module of the de-obfuscation engine, according to an embodiment of the application.

FIG. 4 illustrates an exemplary process flow for providing a simulation of unsupported functions for the JavaScript engine. As show in FIG. 4, training web pages 401 are fed into the web browser 1231 to be executed by a JavaScript engine of the web browser 1231. When the JavaScript engine tries to execute an unsupported function in the web page 401, an error is generated because the JavaScript engine fails to recognize the unsupported function. Consequently, the execution stops. Error message(s) outputted during the execution are collected (402) and analyzed (403), and simulated function(s) corresponding to the error(s) are added to the simulated functions module 1236. Thus, with support from the simulated functions module 1236, the web browser 1231 is able to execute the functions previously unsupported by the web browser 1231. The aforementioned steps may be repeated until no more errors are generated. Then, all unsupported functions contained in the training web pages are collected.

Figure 5:
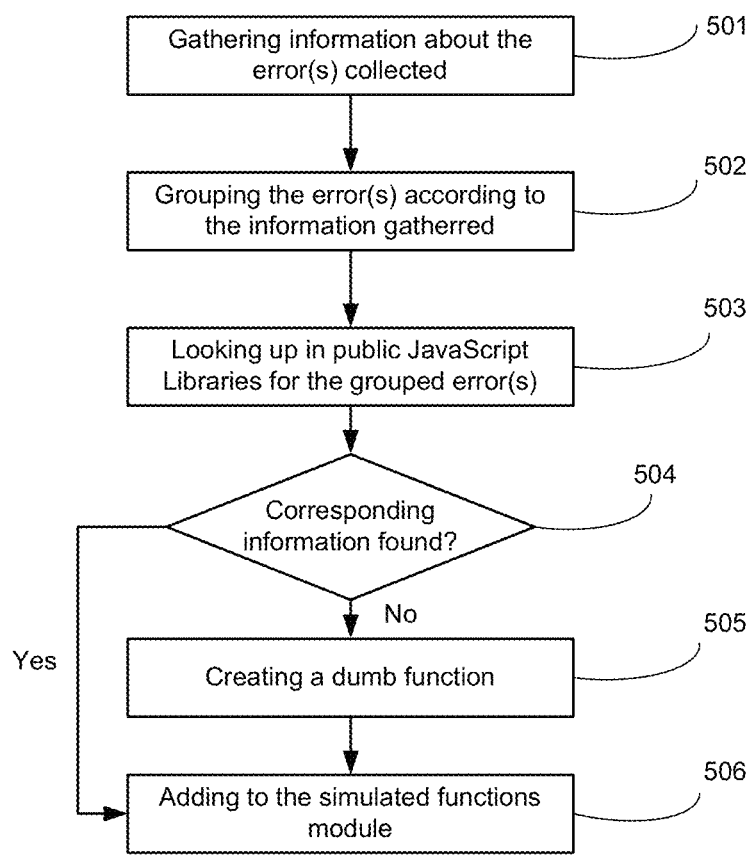
FIG. 5 is a flow diagram of an analysis process of unsupported function according to the embodiment of the application shown in FIG. 4.

More specifically, referring to FIG. 5, the analysis process 403, which may be performed by an analysis module, includes the following steps. In step 501, information about the error(s) collected is gathered. For example, the information may include variable name, line number in the source code, and Uniform Resource Identifier (URI) of the corresponding file. In step 502, error(s) are grouped according to the information gathered. For example, errors have same variable name, line number in the source code, URI of the corresponding file may be grouped together. In step 503, look up in public JavaScript libraries for a corresponding function or library for each grouped error(s). Examples of the public JavaScript libraries include JQuery, which is a multi-browser JavaScript library designed to simplify the client-side scripting of HyperText Markup Language (HTML). If the corresponding function or library is found (step 504), it is added to the simulated functions module (step 506). Otherwise, a dumb function is created (step 505) for simulation and it is added to the simulated functions module (step 506).

2. Malicious Code Detection

Figure 6:
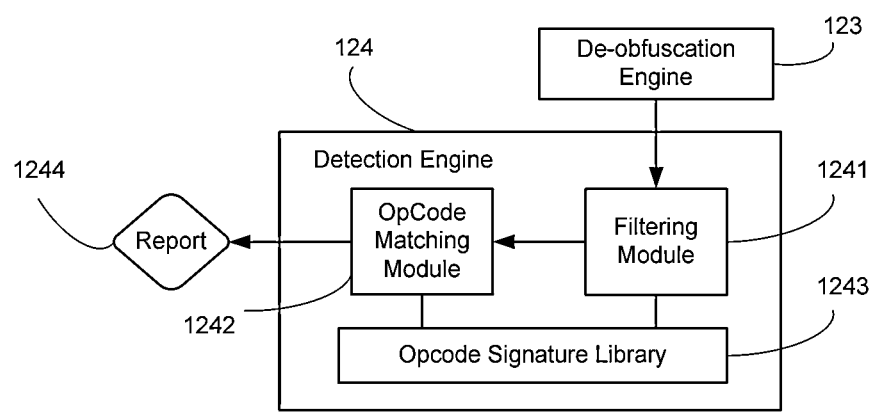
FIG. 6 is a simplified block diagram of a detection engine according to an embodiment of the application.

FIG. 6 illustrates a functional structure of the detection engine 124. The detection engine 124 takes the opcode sequence provided by the de-obfuscate engine 123 as an input, matches the opcode sequence with one or more opcode signatures, and outputs a report about whether a downloaded and de-obfuscated web page contains malicious content or not.

Generally, the detection engine 124 comprises a filtering module 1241, an opcode matching module 1242 and an opcode signature library 1243. After de-obfuscation, a filtering module 1241 in the detection engine 124 firstly filters an opcode sequence outputted from the de-obfuscation engine 123 with one or more opcode signatures in a filtering format. If the opcode sequence passes through the filtering module 1241, an opcode matching module 1242 matches the opcode sequence with one or more opcode signatures in a detection format. Then, if the opcode sequence matches with an opcode signature in the detection format, a report of malicious code alert will be generated.

In order to match malicious code targeting a vulnerability of a client device, an opcode signature is uesed. Example 3 below is a malicious code example that can trigger a JavaScript engine vulnerability, documented by Common Vulnerabilities and Exposures (CVE), CVE-2009-1833. The vulnerability is triggered by two conditions: (i) looking up through prototype chain to get a getter function, and (ii) setting the prototype itself to be null inside the getter function.

In order to match malicious code targeting such a vulnerability, an opcode signature correlating to these two conditions, i.e., "obj:a" and "this: proto=null" together, as shown in the example, is needed.

Example 3

```
1  var obj = new Object ( );
2  obj._proto_._definegetter_("a", function ( ) {
3                              this._proto_=null;
4                              gc ( );
5                              return 0;
6                              });
7  obj.a;
```

The detection engine 124 performs signature matching on the opcode sequence generated by the JS Engine 1233, and makes a determination on whether the opcode sequence contains malicious content or not. Opcode is an instruction set generated by a programming language engine, such as a JavaScript interpreter, or a VBScript interpreter based on JavaScript code for efficient execution. For example, the following Example 4 is an opcode sequence of Example 3.

Example 4

```
[ 199] get_by_id        r0, r1, a(@id1)
[   0] enter
[   1] convert_this r-7
[   3] mov             r0, r-7
[   6] put_by_id       r0, _proto_(@id0), Null(@k0)
[  15] ret Int 32:     0(@k1)
```

The opcode signature library 1243 of the detection engine 124 contains one or more opcode signatures. An opcode signature represents a vulnerability of a web browser and is used for matching with an opcode sequence to determine whether the opcode sequence contains malicious content or not. An opcode signature may have two formats, a filtering format and a detection format.

The filtering format of the opcode signature may be formalized as a regular expression. The regular expression is a sequence of characters that forms a search pattern. The search pattern is mainly for use in pattern matching with strings. For example, a filtering format signature for CVE-2009-1833 is "get_by_id enter*put_by_id". Any code containing the regular expression, i.e., "get_by_id enter*put_by_id" matches the filtering format of the opcode signature for CVE-2009-1833.

An opcode signature in the detection format includes one or more sentences. Each sentence may include an identifier, for example, a number, to represent the sentence and differentiate the sentence from other sentences. Each sentence further includes one or more clauses in sequence. A clause may include one or more matching opcodes for matching with an inputted opcode, a condition, an instruction for instructing an action to be taken, and an identifier identifying the sentence of the opcode signature. If a matching opcode in a clause matches with an opcode of an inputted opcode sequence, and the condition in the clause is determined to be true, then the action instructed in the clause will be taken, and a sentence identified by the identifier in the clause will be applied for continuing the matching process. Some of the clauses are match clauses, each match clause at least include a matching opcode. Each sentence may include a default clause which does not include a matching opcode. Usually, the default clause does not include a condition either. That means once the default clause are applied, no opcode matching need to be performed and no condition need to be determined. Automatically, an action instructed in the default clause will be taken if the default clause includes an instruction, and a sentence will be applied for continuing the matching process if the clause contains an identifier identifying the sentence. The default clause usually is the last clause in a sentence. Clauses in a sentence will be checked sequentially. Once a matched matching clause is found (the matching opcode matches with a obtained opcode of an opcode sequence, and the condition is determined to be true), the matched matching clause is applied, and the remaining clauses, including the default clause, are skipped. Otherwise, if no matched matching clause is found, the default clause will be applied.

An exemplary opcode signature in detection format for CVE-2009-1883 is shown in Table 1. The opcode signature includes three sentences numbered 1, 2 and 3. The sentence 1 includes two clauses; the sentence 2 includes two clauses, and the sentence 3 includes five clauses.

TABLE 1

| # | Opcode | Condition | Action | Next |
|---|--------|-----------|--------|------|
| 1 | get_by_id | isFromProtoChain( ) | x=proto | 2 |
|   | N/A    | N/A       | Quit   | N/A  |
| 2 | enter  | true      | i=0    | 3    |
|   | N/A    | N/A       | Quit   | N/A  |
| 3 | enter  | true      | i=i+1  | 3    |
|   | ret    | i==0      | Quit   | N/A  |
|   | ret    | i>0       | i=i-1  | 3    |
|   | put_by_id | x==dst&src==null | Report | N/A |
|   | N/A    | N/A       | Jmp    | 3    |

As shown in Table 1, the first clause of the sentence 1 includes a matching opcode "get_by_id", a condition "isFromProtoChain( )", an instruction instructing an action to be taken "x=proto", and a number "2" indicating next sentence to be applied is the sentence 2. If the matching opcode "get_by_id" matches with an inputted opcode of an opcode sequence and the condition "isFromProtoChain( )" is determined to be true, then the variable x will be defined as "proto"

as instructed, and the sentence 2, as indicated by the number in the first clause of the sentence 1, will be applied for further matching process. Otherwise, if the matching opcode "get_by_id" does not match with the opcode of the opcode sequence or the condition "isFromProtoChain( )" is determined to be false (not true), then the following clause, i.e., the second clause in the sentence 1, will be applied for further matching process. The second clause of the sentence 1 is a default clause which doesn't include a matching opcode and a condition. This means no opcode matching needs to be performed and no condition needs to be met. An action instructed by the instruction "Quit" should be taken. The instruction "Quit" means no more matching process for the inputted opcode sequence needs to be performed because the opcode sequence does not contain malicious content. Accordingly, the second clause does not include an identifier identifying a sentence because no further sentence needs to be applied for further matching process.

The first clause of the sentence 2 includes an matching opcode "enter", a condition "true" which means actually no condition is required, an instruction instructing an action "i=0", and an identifier indicating the sentence 3. If the matching opcode "enter" matches with an opcode of an inputted opcode sequence, action instruction "i" will be defined as integer 0 and sentence 3 will be taken for continuing the matching process. Otherwise, if no match is found, the following clause, i.e., the second clause of the sentence 2 will be applied. The second clause of the sentence 2 is a default clause, similar to the default clause of the sentence 1, and it does not include any matching opcode, condition, or identifier identifying a sentence to be taken. The instructed action is "Quit", which means the matching process is finished, the opcode sequence does not contain malicious content, no more matching process is needed.

The sentence 3 includes five clauses: a first clause, a second clause, a third clause, a fourth clause, and a fifth clause. The first clause of the sentence 3 includes a matching opcode "enter", a condition "true" which means actually no condition required, an instructed action "i=i+1", and a number 3. If the matching opcode "enter" matches with an opcode of an inputted opcode sequence, "i" will be defined as "i+1" according to the instructed action, and next sentence to be applied is the sentence 3 as indicated. Otherwise, if the matching opcode "enter" does not match with the opcode, the following clause, i.e. the second clause of sentence 3 will be taken.

The second clause of the sentence 3 includes a matching opcode "ret", a condition "i==0", and an instructed action "Quit". If the matching opcode "ret" matches an opcode of an inputted opcode sequence and the condition "i==0" is determined to be true, then the instructed action "Quit" will be taken. This means the matching process is finished, and the inputted opcode sequence does not contain malicious content. Accordingly, no further sentence will be taken to perform the matching process. Otherwise, if the matching opcode does not match with the inputted opcode, or the Condition "i==0" is determined to be false (not true), then the following clause, i.e., the third clause will be taken.

The third clause includes a matching opcode "ret", a condition "i>0". If the matching opcode "ret" matches with an opcode of an inputted opcode sequence, and the condition "i>0" is determined to be true, then "i" is defined as "i-1" according to the action instructed in the third clause, and next sentence to be applied is the sentence 3 as identified in the third clause. Otherwise, if the matching opcode does not match with the opcode, or the condition "i>0" is determined to be not true, the next clause, i.e., the fourth clause will be applied.

The fourth clause includes a matching opcode "put_by_id", a condition "X==dst&src==null", an instructed action "Report". If the matching opcode "put_by_id" matches with an opcode of an inputted opcode sequence, and the condition "X==dst&src==null" is determined to be true, the action instructed is to report that malicious content have been detected. This means the inputted opcode sequence contains malicious content. Accordingly, the conclusion has been made, no more sentences need to be applied next, and the matching process is finished. Otherwise, if the matching opcode "Put_by_id" does not match with the opcode or the condition "X==dst&src==null" is determined to be false (not true), then the next clause, i.e., the fifth clause, will be taken.

The fifth clause is a default clause which doesn't include a matching opcode or condition. No opcode matching need to be performed and no condition required to be met, and a sentence identified in the fifth clause, i.e., the sentence 3, will be taken.

Figure 7:
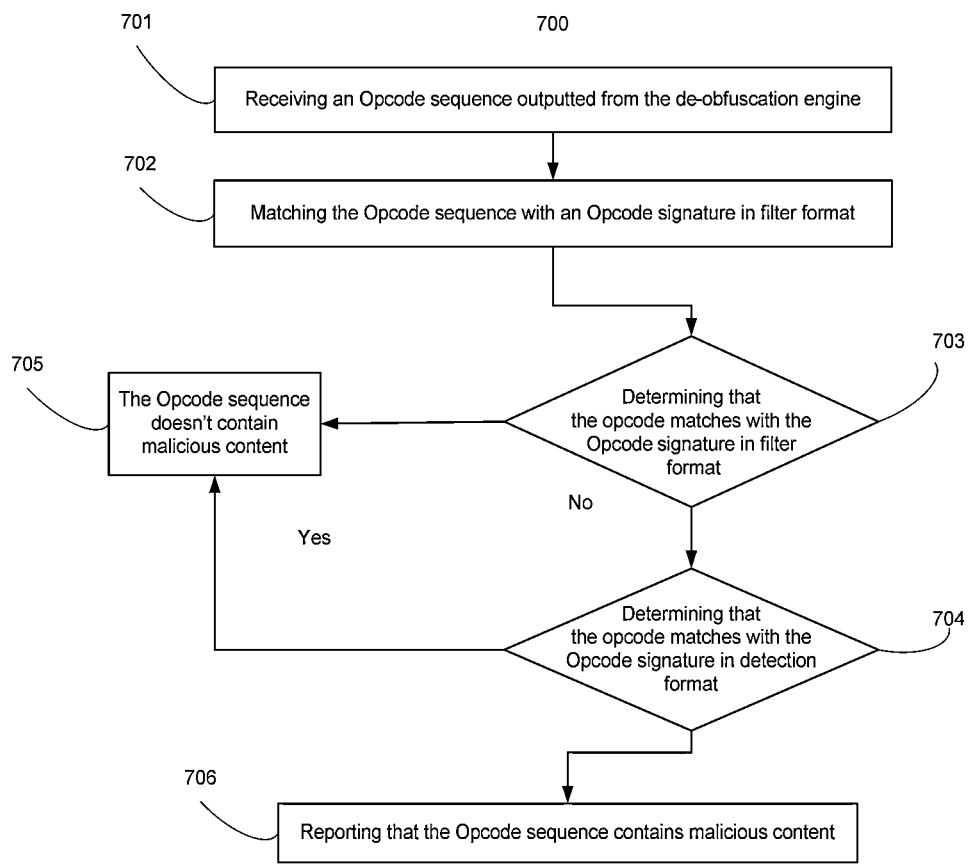
FIG. 7 is a simplified flow chart of a malicious code detecting process according to an embodiment of the application.

Referring now to FIGS. 6 and 7, the opcode signature matching process as exemplified above can be divided into two parts: (1) matching an inputted opcode sequence with an opcode signature in the filter format, performed by the filtering module, (2) and matching the inputted opcode sequence with an opcode signature in the detection format, performed by the opcode matching module.

The opcode signature matching process 700 includes the following steps. Firstly, the detection engine 124 receives an opcode sequence outputted from the de-obfuscation engine 123 (step 701). The opcode sequence is fed into the filtering module 1241 (step 702). The filtering module 1241 obtains an opcode signature in the filtering format, for example, "get_by_id enter*put_by_id". If the filtering module 1232 determines that the opcode signature in filter format matches the opcode sequence (step 703), the opcode sequence will be send to the opcode matching module 1231 for further detection (step 704). Otherwise, if the opcode sequence doesn't matche with the opcode signature in the filtering format, the opcode sequence will be filtered out. This means the opcode sequence does not contain malicious content (step 705), thus no further detection needs to be performed.

By filtering a large amount of unmatched samples (opcode sequences) in a fast regular expression operation, the speed of the total matching process may increase significantly.

The opcode matching module 1242 receives the opcode sequence from the filtering module 1241 if the opcode sequence is matched with the opcode signature in the filtering format. However, people skilled in the art would readily appreciate that the filtering module 1241 is optional, and all opcode sequences can be directly fed into the opcode matching module 1242 for the detection purpose.

The opcode matching module 1242 performs a matching process to determine whether the opcode sequence contains malicious content. A pseudo-code of a matching algorithm is shown in FIG. 8. Given an opcode sequence as an input, the opcode matching module 1242 sequentially checks every opcode in the opcode sequence. For each opcode in the opcode sequence, the opcode matching module goes over every opcode signature associated with the inputted opcode sequence in the detection format. For each associated opcode signature, the opcode matching module 1242 fetches a corresponding clause that belongs to the sentence of the current state. If the opcode matching module 1242 determines that the opcode of the current clause match the current opcode, and the conditions of the current clause is met, then, accordingly takes actions instructed in the current clause and applies next sentence indicated in the current clause, if any. If the default clause of the current sentence is taken, accordingly takes actions indicated in the default clause and move to next sentence indicated in the current clause.

As an example, the opcode sequence as shown in Example 3 is fed into the opcode matching module. The matching module, again, as an example, takes the opcode signature as shown in Table 1 to match the opcode sequence shown in Example 3.

Firstly, the first clause of the sentence 1 is set as the current clause. The matching opcode "get_by_id" matches the opcode "get_by_id" in the current clause. The condition "isFromProtoChain( )" is determined to be true. Then, "x" is defined as "proto", and applies sentence 2 as indicated in the current clause for further matching process described below.

Now the first clause in the sentence 2 is the current clause. The following opcode of Example 4 "enter" matches with the matching opcode in the current clause, i.e., the first clause of the sentence 2. The condition in the condition field is "true", then "i" is defined as "0", and sentence 3 as indicated in the current clause is applied for further matching process.

Now the first clause in the sentence 3 is the current clause. The following opcode of Example 4 "convert_this r–7" does not match the matching opcode in the current clause, which is "enter". The second clause in the sentence 3 is applied as the current clause. The matching opcode in the current clause does not match with the opcode "convert_this r–7". Similarly, "convert_this r–7" fails to match the third, fourth clauses. The default clause, i.e., the fifth clause, is applied. Then the action instructed in the fifth clause is taken, jumping to the next sentence, i.e., sentence 3, as indicated in the fifth clause.

Similarly, the following opcode of Example 4 "mov" fails to match the first, second, third, and fourth clauses, and again, the current sentence is still sentence 3.

The following opcode of Example 4 "put_by_id" matches the matching opcode in the fourth clause in sentence 3. The "condition x==dst&src==null" is determined to be met. The action "report" instructed in the fourth clause of the sentence 3 is taken, which means the inputted opcode sequence contains malicious code and should be reported. No next sentence needs to be taken.

Persons of ordinary skill in the art should appreciate that, in combination with the examples described in the embodiments herein, units and algorithm steps can be implemented by electronic hardware, or a combination of computer software and electronic hardware. Whether the functions are executed by hardware or software depends on the specific applications and design constraint conditions of the technical solutions. Persons skilled in the art can use different methods to implement the described functions for every specific application, and the different method to implement the described functions should not be considered as beyond the scope of the present application.

When being implemented in the form of a software functional unit and sold or used as a separate product, the functions may be stored in a computer-readable storage medium. Based on such understanding, the technical solutions of the present application essentially, or the part contributing to the prior art, or part of the technical solutions may be implemented in a form of a software product. The computer software product may include instruction or instructions for instructing a computer device, or more specifically, one or more processor in the computer device together with a memory (the computing device may be a personal computer, a server, a network device, or the like) to execute all or part of the steps of the method described in each embodiment of the present application. The storage medium includes any medium that can store program codes, such as a U-disk, a removable hard disk, a read-only memory (ROM), a random access memory (RAM), a magnetic disk, or an optical disk.

What is claimed is:

1. A method, executed by a computing device, for identifying malicious codes in electronic contents, comprising:
   obtaining an opcode (operation code) sequence from a downloaded content, wherein the opcode sequence comprises a first opcode and a second opcode; and
   comparing the opcode sequence with a pre-stored opcode signature to determine whether the opcode sequence contains any malicious code,
   wherein the opcode signature comprises a first sentence and a second sentence, the first sentence includes a first matching clause, the first matching clause comprises a first matching opcode, a first condition, a first instruction for a first action to be taken, and an identifier identifying the second sentence; the second sentence comprises one or more second matching clauses and a default clause, each second matching clause includes a second matching opcode, a second condition, and a second instruction for a second action to be taken, and the default clause includes a third instruction for a third action to be taken;
   and wherein comparing the opcode sequence with a pre-stored opcode signature to determine whether the opcode sequence contains any malicious code comprises:
   determining whether the first opcode of the opcode sequence matches with the first matching opcode, and the first condition is true;
   if the first opcode matches with the first matching opcode, and the first condition is true, taking the first action according to the first instruction;
   searching the second sentence for a matching clause among the one or more second matching clauses, wherein the second opcode of the opcode sequence matches with a matching opcode of the matching clause;
   if the matching clause in the second sentence is found, and the second condition in the matching clause is true, taking an action according to the second instruction in the matching clause,
   if the matching clause in the second sentence is not found, taking the third action according to the third instruction in the default clause of the second sentence.

2. The method according to claim 1, wherein the third action includes reporting that the opcode sequence contains malicious code.

3. The method according to claim 1, wherein the second opcode is placed sequentially next to the first opcode in the opcode sequence.

4. The method according to claim 1, wherein the method further comprises:
   after receiving the opcode sequence and before obtaining the opcode signature to determine whether the opcode sequence contains malicious content,
   obtaining the opcode signature in a filtering format which includes an expression; and
   determining whether the opcode sequence contains any opcode that matches with the expression.

5. The method according to claim 1, wherein before obtaining the opcode sequence, the method further comprises:
   obtaining the downloaded content; and
   wherein obtaining the opcode sequence from the downloaded content comprises:
   executing codes of the downloaded content by a program installed in the computing device to obtain the opcode sequence.

6. A computing device for identifying malicious code in electronic contents, comprising:
  a memory; and
  one or more processors;
  wherein the memory is configured to store an opcode (operation code) signature and one or more software modules executed by the one or more processors, the one or more software modules including instructions for:
  obtaining an opcode sequence from a downloaded content, wherein the opcode sequence comprises a first opcode and a second opcode; and
  comparing the opcode sequence with the opcode signature to determine whether the opcode sequence contains any malicious code,
  wherein the opcode signature comprises a first sentence and a second sentence, the first sentence includes a first matching clause, the first matching clause comprises a first matching opcode, a first condition, a first instruction for a first action to be taken, and an identifier identifying the second sentence; the second sentence comprises one or more second matching clauses and a default clause, each second matching clause includes a second matching opcode, a second condition, and a second instruction for a second action to be taken, and the default clause includes a third instruction for a third action to be taken;
  and wherein comparing the opcode sequence with the opcode signature to determine whether the opcode sequence contains any malicious code comprises:
  determining whether the first opcode of the opcode sequence matches with the first matching opcode, and the first condition is true;
  if the first opcode matches with the first matching opcode, and the first condition is true, taking the first action according to the first instruction;
  searching the second sentence for a matching clause among the one or more second matching clauses, wherein the second opcode of the opcode sequence matches with a matching opcode of the matching clause;
  if the matching clause in the second sentence is found, and the second condition in the matching clause is true, taking an action according to the second instruction in the matching clause,
  if the matching clause in the second sentence is not found, taking the third action according to the third instruction in the default clause of the second sentence.

7. The computing device according to claim 6, wherein the third action includes reporting that the opcode sequence contains malicious code.

8. The computing device according to claim 6, wherein the second opcode is placed sequentially next to the first opcode in the opcode sequence.

9. The computing device according to claim 6, wherein the one or more software module further includes instructions for:
  obtaining the opcode signature in a filtering format which includes an expression; and
  determining whether the opcode sequence contains any opcode that matches with the expression.

10. The computing device according to claim 6, wherein the one or more software module further includes instructions for:
  obtaining the downloaded content; and
  wherein obtaining the opcode sequence from the downloaded content comprises:
  executing codes of the downloaded content by a program installed in the computing device to obtain the opcode sequence.

11. The computing device according to claim 6, wherein the computing device is a client device connected to Internet, or a proxy server connected to the Internet and serving a client device.

12. A computer program product for identifying malicious code in electronic contents, comprising a non-transitory computer readable storage medium storing computer readable instructions, wherein when the computer readable instructions are executed by a computing device, cause the computing device to perform a method that comprises:
  obtaining an opcode (operation code) sequence from a downloaded content, wherein the opcode sequence comprises a first opcode and a second opcode; and
  comparing the opcode sequence with a pre-stored opcode signature to determine whether the opcode sequence contains any malicious code,
  wherein the opcode signature comprises a first sentence and a second sentence, the first sentence includes a first matching clause, the first matching clause comprises a first matching opcode, a first condition, a first instruction for a first action to be taken, and an identifier identifying the second sentence; the second sentence comprises one or more second matching clauses and a default clause, each second matching clause includes a second matching opcode, a second condition, and a second instruction for a second action to be taken, and the default clause includes a third instruction for a third action to be taken;
  and wherein comparing the opcode sequence with a pre-stored opcode signature to determine whether the opcode sequence contains any malicious code comprises:
  determining whether the first opcode of the opcode sequence matches with the first matching opcode, and the first condition is true;
  if the first opcode matches with the first matching opcode, and the first condition is true, taking the first action according to the first instruction;
  searching the second sentence for a matching clause among the one or more second matching clauses, wherein the second opcode of the opcode sequence matches with a matching opcode of the matching clause;
  if the matching clause in the second sentence is found, and the second condition in the matching clause is true, taking an action according to the second instruction in the matching clause,
  if the matching clause in the second sentence is not found, taking the third action according to the third instruction in the default clause of the second sentence.

13. The computer program product according to claim 12, wherein the third action includes reporting that the opcode sequence contains malicious code.

14. The computer program product according to claim 12, wherein the second opcode is placed sequentially next to the first opcode in the opcode sequence.

15. The computer program product according to claim 12, wherein the method further comprises:
  obtaining the opcode signature in a filtering format which includes an expression; and
  determining whether the opcode sequence contains any opcode that match with the expression.

16. The computer program product according to claim 12, wherein the method further comprises:
  obtaining the downloaded content; and
  wherein obtaining the opcode sequence from the downloaded content comprises:

executing codes of the downloaded content by a program installed in the computing device to obtain the opcode sequence.

17. The computer program product according to claim 12, wherein the computing device is a client device connected to Internet, or a proxy server connected to the Internet and serving a client device.

\* \* \* \* \*